Aug. 23, 1966  R. POOLE  3,267,978
METHOD OF PRODUCING CAMBERED CAUL BOARDS
Filed Oct. 21, 1963  3 Sheets-Sheet 2
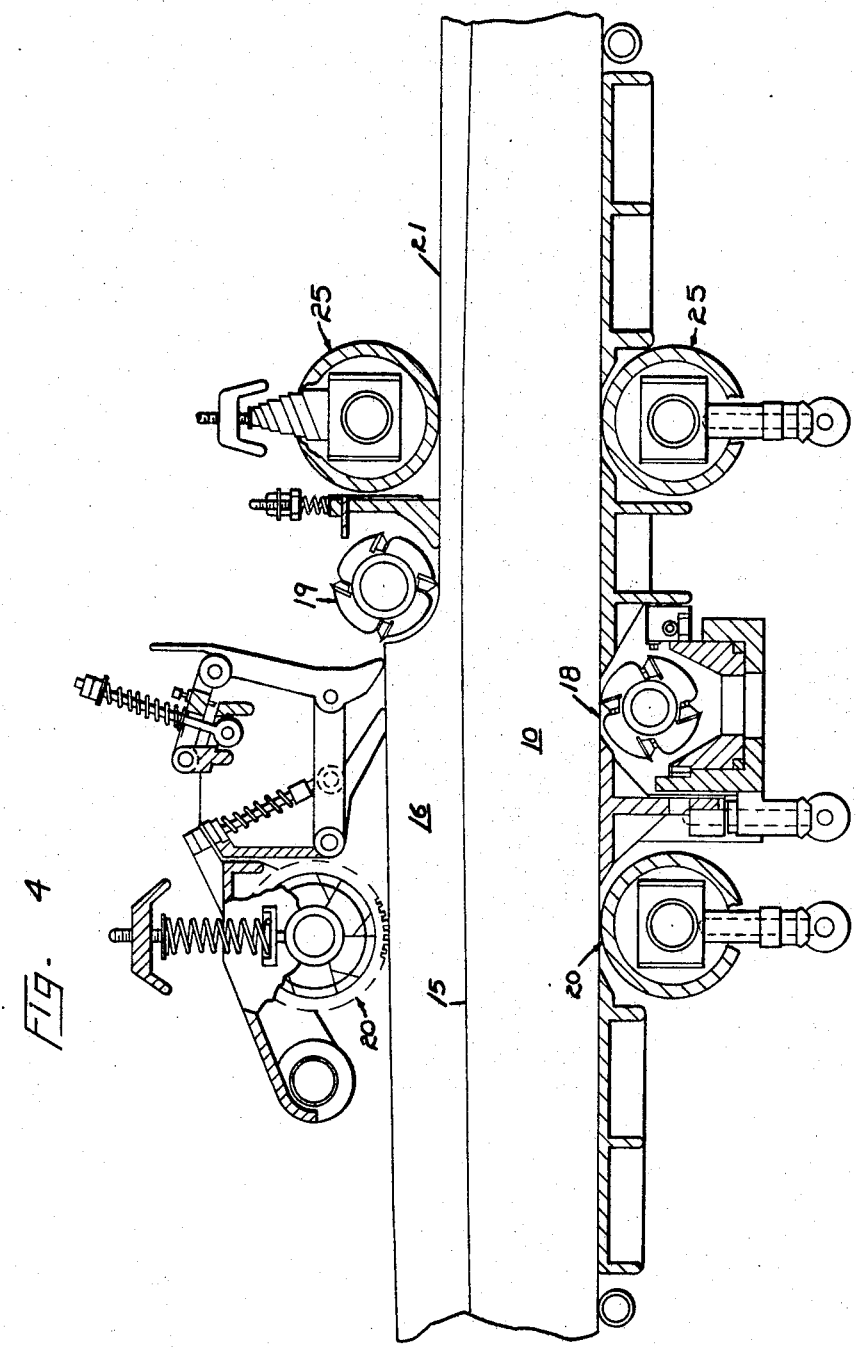
INVENTOR.
ROYCE POOLE
BY *Wells & St. John*
ATTYS.

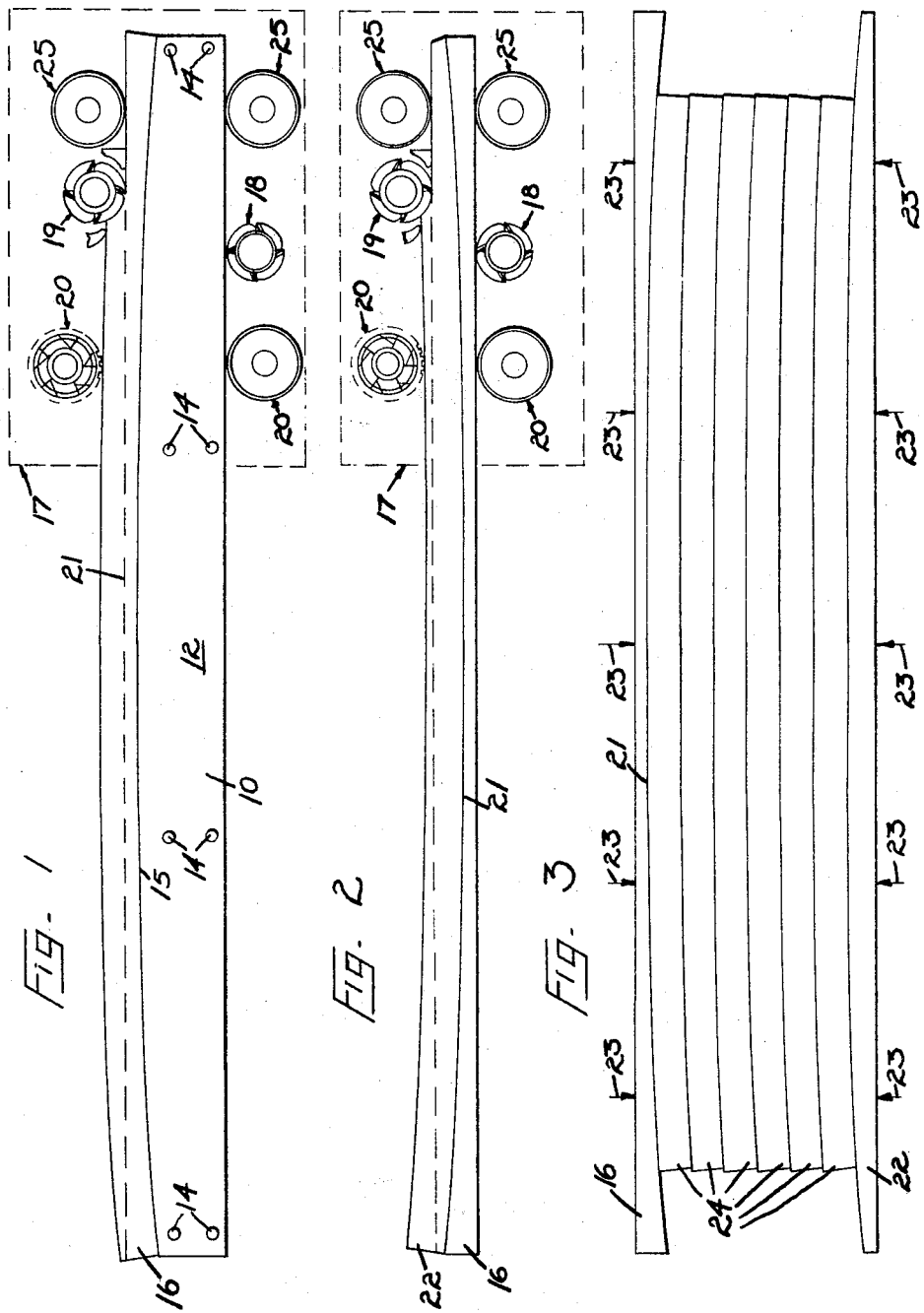

Aug. 23, 1966   R. POOLE   3,267,978
METHOD OF PRODUCING CAMBERED CAUL BOARDS
Filed Oct. 21, 1963   3 Sheets-Sheet 3
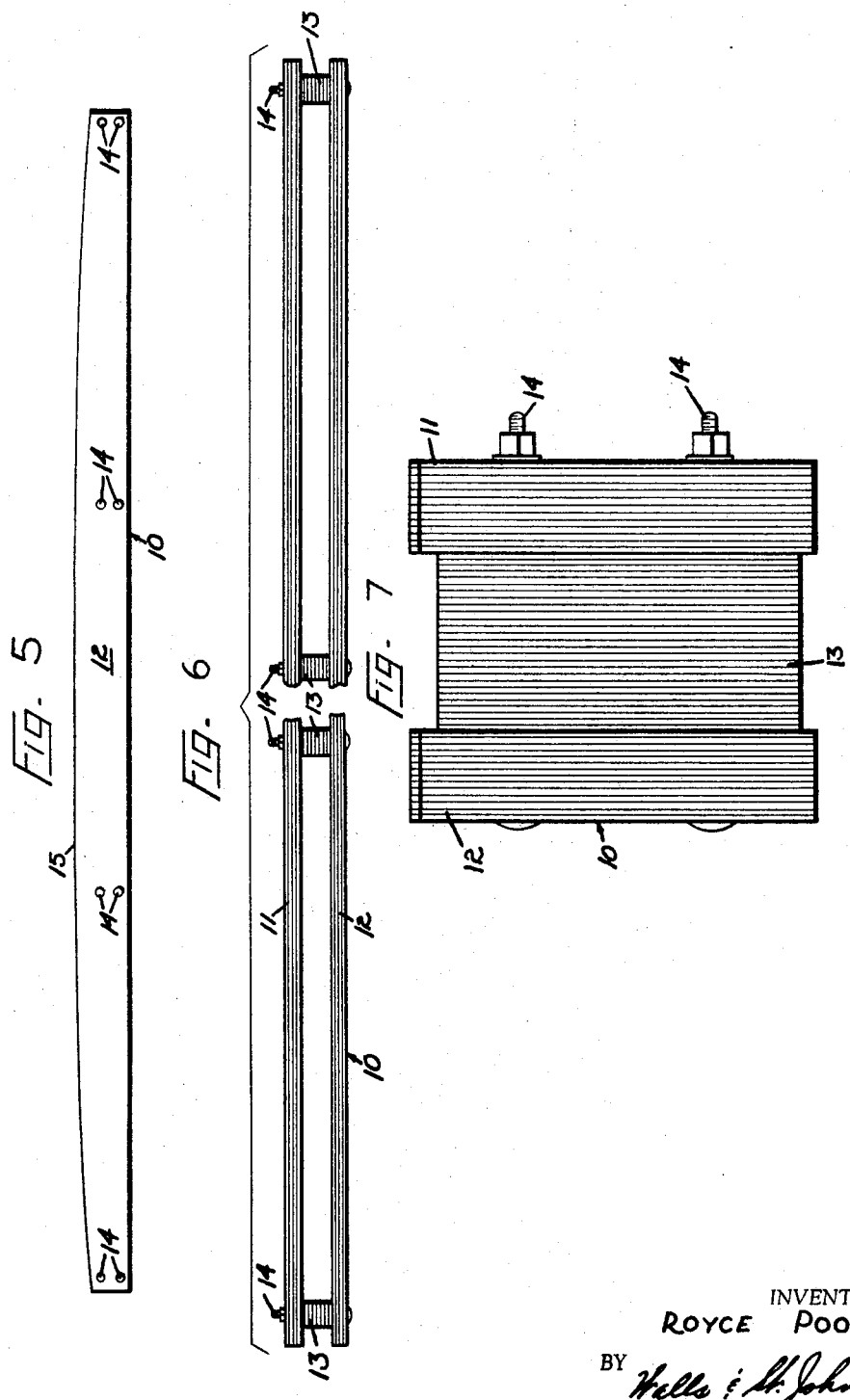
INVENTOR.
ROYCE POOLE
BY
ATTYS.

3,267,978
METHOD OF PRODUCING CAMBERED
CAUL BOARDS
Royce Poole, Warren, Ark., assignor to Potlatch Forests, Inc., Lewiston, Idaho, a corporation of Delaware
Filed Oct. 21, 1963, Ser. No. 317,544
1 Claim. (Cl. 144—323)

This invention relates to a novel method of making matched sets of caul boards that are cambered or curved longitudinally along oppositely facing surfaces, the boards being designed for use in the laminating of cambered wooden beams.

In recent years, it has become increasingly popular to use laminated wood beams for ceiling structures. It is also desirable in many instances, that these beams be cambered for greater strength properties over wide unsupported spans. The camber or radius on which the beams are bent need not be great, but must be uniform along the beam length, a typical 18 foot beam curved along a radius of 1200 feet being a practical example.

It is a first object of this invention to provide a novel and very simple method by which complementary cambered caul boards can be produced in perfectly matched pairs, so that when used in a laminating press, these caul boards will insure uniform glue line pressure along the entire length of the beam.

Another object of this invention is to provide a method of producing cambered caul boards in matched pairs, beginning with a single rigid pattern formed with one surface having the desired camber.

These and further objects will be evident from a study of the following disclosure, taken in conjunction with the accompanying drawings, which illustrate one preferred form of the invention, it being understood that the illustrated disclosure is only exemplary and not intended to restrict the scope of the invention, which is set out in the claims following this disclosure.

In the drawings:

FIGURE 1 is a diagrammatic view illustrating the first step in producing a cambered caul board from a basic rigid pattern;

FIGURE 2 is a view similar to FIGURE 1, showing the production of the matched caul board from the first machined caul board;

FIGURE 3 is a diagrammatic view of a beam being produced from the two caul boards;

FIGURE 4 is a longitudinal sectional view through a typical planer, showing the cutting of the initial caul board, using the basic rigid pattern;

FIGURE 5 is an elevation view of the pattern;

FIGURE 6 is an enlarged top view of the pattern shown in FIGURE 5, the central portion of the pattern being broken away; and FIGURE 7 is an enlarged end view of the pattern shown in FIGURES 5 and 6.

The basic method contemplated by this invention can best be understood by the three diagrammatic views shown in FIGURES 1 through 3. Initially, a rigid pattern 10 must be fabricated by hand or by machine methods, using laminated side members 11 and 12 shown in FIGURES 5 through 7. This pattern utilizes the stiff side members 11, 12 on end, spaced by laminated blocks 13 secured by bolt assemblies 14. Pattern 10 is of the same approximate length as the beams to be produced, and has a top convex edge 15 of the desired curvature required in the finished beam.

The pattern 10 is used to produce the caul boards from conventional single boards of dimension lumber, such as a 2 by 8. In the example shown in FIGURES 1, 2, and 3, the pattern 10 is first utilized during the machine surfacing of a concave caul board from a 2 by 8 board 16. In order to accomplish this, the board 16 is placed on the pattern 10 in abutment with edge 15, and is fed through a conventional planer or surfacer, which is designated generally in the diagrammatic views by the numeral 17.

The planer 17 is set with the lower cylinder 18 just out of contact with the material being fed through the planer 17, and with the upper cylinder 19 being the only operating cylinder. The planer 17 is set with an opening of 8 and ⅛ inches. The end height of the pattern 10 in one specific example might be 6 and ⅝ inches and its central height 7 inches, assuming a radius of twelve hundred feet, and a pattern length of 18 feet, 2 inches. Since the real thickness of a 2 by 8 is 1 and ¾ inches, and 8 and ⅛ opening of the planer 17 will result in the removal of ¼ inch at each end of the board 16 and a maximum removal of ⅝ of an inch at the center of the board 16, which in this example would be 18 feet in length.

The infeed rolls 20 are set so as to insure that the board 16 is bent in intimate contact with the unyielding edge 15 of the pattern 10, so that the cutting of the board 16 will produce a surface 21 that is complementary in curvature to the edge 15. The planer 17 also includes upper and lower outfeed rolls 25 that serve to maintain the board 16 and pattern 10 in proper contact so that the board 16 is bent properly relative to pattern 10 during the cutting operation.

To form a matched caul board, a second similar board 22 is placed upon the first board 16, resting upon the machined concave edge 21. The two boards 22 and 16 are then fed through the planer 17, which must be reset to a 2 and ⅝ inch opening. Again, the top cylinder 19 is the only cylinder in planer 17 operating to surface the boards. This second operation will therefore result in the removal of a maximum thickness of ⅝ inch at the ends of the boards 22, and ¼ inch at its center the direct opposite of the machining operation performed on board 16.

In this manner, the method just described produces two boards 16 and 22 which are respectively concave and convex along a single surface, the boards 16 and 22 being perfectly matched in curvature, while having complementary surfaces.

The laminating step is shown diagrammatically in FIGURE 3, the boards 16 and 22 being placed in a press which directs force in the direction of arrows 23. The boards 16 and 22 will be located in the press with their plane surfaces against the press platens, and their respective concave and convex surfaces facing one another and separated by the laminates 24 desired in the finished beam. By utilizing caul boards 16 and 22 that are precisely matched as to surface configuration, the present method insures uniform and constant glue line pressure along the entire length of each laminate 24. This greatly facilitates the gluing of a laminated beam, and reduces weaknesses in the finished beam due to nonuniform curing of the glue lines.

In FIGURE 4 is shown more precisely a cross sectional view of a typical planer during the trimming of the board 16, using the initial pattern 10. The planer has the usual provisions for adjustment of the relative locations of the various rollers and cylinders, and it is set so that the upper spring biased infeed roll 20 presses the board 16 against the surface 15 of the pattern 10. The planer must be further set so that the lower cylinder 18 is out of contact with the pattern 10 and is not in operation. The upper cylinder 19 is arranged at the desired separation from the plane bottom surface of the pattern 10, and is the member utilized to produce the top surface 21 of the board 16. The spring biased outfeed rolls 25 serve further to maintain the contact of the board 16 against the top edge 15 of the pattern 10.

In the drawings, the cambered curvature of the pattern 10 and boards 16 and 22 has been exaggerated for purposes of illustration. Normally the camber is quite slight, but must be exactly matched in the pair of caul boards for proper beam production. The instant method can be utilized to produce beams of any desired camber, depending upon the camber of the initial pattern 10. Thus, a manufacturer of beams can produce new caul boards whenever necessary to replace those that have been damaged by pressure or by contact with glue. Each set of caul boards will be perfectly matched so as to insure proper gluing pressure. The caul boards, which are vulnerable to damage, can thus be cheaply replaced, while protecting the more expensive permanent pattern from any damage due to glue or pressure. Thus the manufacturer need only stock a set of patterns 10, for continuous use in producing the desired caul boards 16 and 22.

Various changes in the particular steps of the method as described above might be necessary in order to meet size requirements of particular presses. It is believed that these changes are evident from the disclosure given, and that this invention should not be limited to a particular size or length of caul board nor to a particular type of camber. The camber might be on a continuous radius or on various radii, depending upon the desired configuration of the final beam.

Having thus described my invention, I claim:

A method of producing matched caul boards of complementary configuration comprising the following steps:

machining a rigid pattern of wood, including a longitudinal plane surface and an opposite longitudinal surface having the desired curved longitudinal configuration;

laying longitudinally upon the curved surface of the pattern a rectangular board of constant thickness;

feeding the board and pattern through a planer while in abutment with one another so as to trim the board surface opposite to that resting upon the pattern while bending the board in surface to surface contact with the pattern along the curvature of the abutted pattern surface, the separation between the board surface being trimmed and the plane surface of the pattern being constant and of a magnitude less than the minimum combined thickness of the board and pattern and greater than the maximum thickness of the pattern alone;

separating the trimmed board from the pattern;

placing a second board on the trimmed board in longitudinal alignment therewith and abutting the surface cut previously by the planer;

and feeding the two boards through a planer while in such abutment with one another so as to trim the board surface of said second board opposite to that resting upon the trimmed board while bending the second board in surface to surface contact with said board along the curvature of the previously trimmed surface thereof, the separation between the board surface being trimmed on said second board and the plane surface of said trimmed board being constant and of a magnitude less than the minimum combined thickness of the two boards and greater than the maximum thickness of said trimmed board alone.

References Cited by the Examiner

UNITED STATES PATENTS

| 487,406 | 12/1892 | Friedrichs | 144—134 |
| 857,757 | 6/1907 | Reid | 144—134 |
| 1,890,272 | 12/1932 | Gough | 144—314 |
| 3,063,482 | 11/1962 | Hudson | 144—127 |
| 3,094,747 | 6/1963 | Hess | 20—91 |

FOREIGN PATENTS

| 23,744 | 4/1906 | Austria. |
| 44,583 | 10/1910 | Austria. |
| 475,348 | 4/1929 | Germany. |

HAROLD D. WHITEHEAD, *Primary Examiner.*

WILLIAM W. DYER, *Examiner.*